United States Patent [19]
Coke et al.

[11] Patent Number: 5,708,849
[45] Date of Patent: Jan. 13, 1998

[54] IMPLEMENTING SCATTER/GATHER OPERATIONS IN A DIRECT MEMORY ACCESS DEVICE ON A PERSONAL COMPUTER

[75] Inventors: James S. Coke, Cameron Park; Ajay V. Bhatt, Eldorado Hills; Stan Graham, Cameron Park; David Lent, Placerville, all of Calif.

[73] Assignee: Intel Corporation, Santa Clara, Calif.

[21] Appl. No.: 791,008

[22] Filed: Jan. 27, 1997

Related U.S. Application Data

[63] Continuation of Ser. No. 187,751, Jan. 26, 1994, abandoned.
[51] Int. Cl.$^6$ .............................................. G06F 13/10
[52] U.S. Cl. ........................................ 395/842; 395/310
[58] Field of Search .................................. 395/842, 843, 395/844, 845, 846, 847, 848, 310

[56] References Cited

U.S. PATENT DOCUMENTS

| | | | |
|---|---|---|---|
| 5,155,830 | 10/1992 | Kurashige | 395/844 |
| 5,175,825 | 12/1992 | Starr | 395/425 |
| 5,182,800 | 1/1993 | Farrell et al. | 395/844 |
| 5,212,795 | 5/1993 | Hendry | 395/848 |
| 5,251,303 | 10/1993 | Fogg, Jr. et al. | 395/844 |
| 5,291,582 | 3/1994 | Drako et al. | 395/425 |
| 5,333,290 | 7/1994 | Kato | 395/846 |
| 5,333,294 | 7/1994 | Schnell | 395/846 |
| 5,367,639 | 11/1994 | Sodos | 395/844 |

*Primary Examiner*—Eddie P. Chan
*Assistant Examiner*—Hiep T. Nguyen
*Attorney, Agent, or Firm*—Blakely, Sokoloff, Taylor & Zafman

[57] ABSTRACT

A direct memory access (DMA) circuit includes a first register for storing an address for the transfer of data, apparatus for transferring data at sequential addresses beginning at the address in the first register until all data at sequential addresses has been transferred, a second register for storing a beginning address for a list of addresses, and a state machine which responds to the completion of a transfer of data at sequential addresses beginning at the address in the first register and an indication that more data is to be transferred to transfer an address from the list at the address in the second register to the first register and causes the apparatus for transferring data to commence.

19 Claims, 5 Drawing Sheets

IMPLEMENTING SCATTER/GATHER OPERATIONS IN A DIRECT MEMORY ACCESS DEVICE ON A PERSONAL COMPUTER

This is a continuation of application Ser. No. 08/187,751, filed Jan. 26, 1994, now abandoned.

BACKGROUND OF THE INVENTION

1. Field of the Invention

This invention relates to computer systems, and more particularly, to an architecture and a method for transferring data by means of a direct memory access device utilizing scatter/gather techniques in a computer system based on an Intel microprocessor.

2. History of the Prior Art

A substantial portion of the work accomplished in the operation of all computers deals with transferring information to and from internal and external devices. For example, information utilized by the central processing unit of a computer must usually be acquired initially from an external device such as a floppy disk or a network and stored in main memory so that the information may be used by the central processing unit. On the other hand, it is often necessary to transfer data stored at many disparate places in memory to an input/output device or to transfer data from an input/output device to many different places in memory.

In order to relieve the central processing unit of the burden of transferring data between input/output devices and memory, the operation is often accomplished by means of devices such as direct memory access (DMA) controllers and input/output controllers. For example, when the central processing unit determines that an input/output operation is needed, it gives a short series of commands to the DMA controller. These commands usually include an address where the information is to be found, tell the amount of information to be transferred, and indicate where the information is to be placed. The DMA controller takes these commands and starts the transfer. In the meantime, the central processing unit may continue on to other operations awaiting an interrupt from the DMA controller to signify that the transfer has been completed. Although the central processing unit could have accomplished (and often does accomplish) the operation itself, it would have had to have been involved in all of the steps of the transfer, steps requiting a number of commands and a substantial amount of central processing unit time. Thus the use of a DMA controller may save a computer system a substantial amount of time in its operation.

Although the use of DMA controllers helps speed the system, they have not been used to their fullest where they are most often found, in desktop personal computers. For example, DMA controllers are especially useful in carrying out those operation which have been referred to in the prior art as scatter/gather operations. An example of a scatter/gather operation is one in which blocks of data stored at many different non-sequential addresses in memory is transferred to an input/output device entirely without the assistance of the host processor except to start the initial operation. Another example is one in which data in an input/output device is transferred to and stored in blocks of memory at many different non-sequential addresses in memory entirely without the assistance of the host processor except to start the initial operation. Normally such operations are accomplished on a page basis and thus involve the transfer of large amounts of information.

Although it would be very useful to be able to utilize DMA controllers in executing scatter/gather operations in order to relieve the central processor of this work, this has not been accomplished heretofore in the typical personal computers which utilize the microprocessors manufactured by Intel Corporation of Santa Clara, Calif., by far the largest group of personal computers to be found. There are many situations in which it would be desirable to transfer information between main memory and input/output devices of such computer systems in scatter/gather operations without the need to utilize the central processor to accomplish the operation.

SUMMARY OF THE INVENTION

It is, therefore, an object of the present invention to provide improved DMA circuitry capable of substantially assisting the central processing unit of a computer system in carrying out data transfer operations.

It is another more specific object of the present invention to provide apparatus and a method for implementing DMA scatter/gather techniques on an Intel microprocessor based personal computer system.

These and other objects of the present invention are realized in a direct memory access (DMA) circuit for an Intel architecture personal computer including a first register for storing an address for the transfer of data, apparatus for transferring data at sequential addresses beginning at the address in the first register until all data at sequential addresses has been transferred, a second register for storing a beginning address for a list of addresses, and a state machine which responds to the completion of a transfer of data at sequential addresses beginning at the address in the first register and an indication that more data is to be transferred to transfer an address from the list at the address in the second register to the first register and to cause the apparatus for transferring data to commence.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
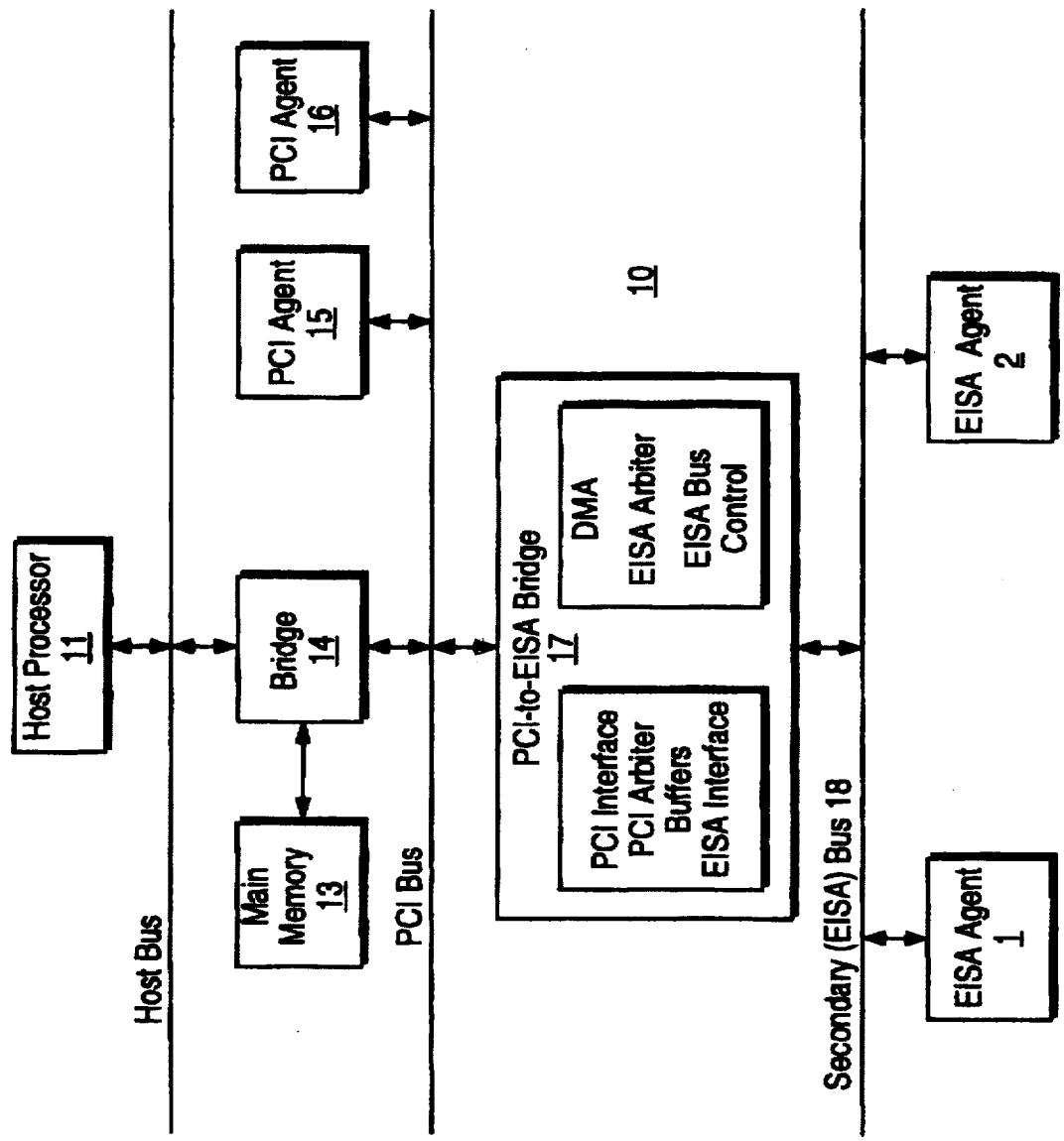
FIG. 1 is a block diagram illustrating a computer system in which the present invention may be utilized.

Referring now to FIG. 1, there is illustrated a computer system 10 which may utilize the present invention. The system 10 includes a central processor 11 such as an Intel i486® microprocessor which carries out the various instructions provided to the computer 10 for its operations. The central processor 11 is joined through a host bus and a bridge circuit 14 to a bus 12 adapted to carry information to various components of the system 10. The bus 12 is designed as a PCI bus in order to allow the transfer of data to and from the central processor 11 at a rate faster than is possible utilizing the typical ISA or EISA buses used by the prior art. Also joined to the PCI bus 12 by the bridge circuit 14 is main memory 13 which is typically constructed of dynamic random access memory arranged in a manner well known to those skilled in the prior art to store information during a period in which power is provided to the system 10. The bridge circuit 14 is adapted to provide various functions necessary to the transfer of data among the central processor 11, main memory 13, and the PCI bus 12. The bridge circuit 14 includes circuitry for providing interfaces to each of the central processor 11 and main memory 13, circuitry for providing an interface to the PCI bus 12 as either a bus master or a bus slave, and cache control and data synchronization circuitry.

Also connected to the PCI bus 12 are PCI bus agent circuits 16 which may one of a number of different component circuits. The circuits 16 may include PCI bus master and PCI bus slave circuits. The main properties of a PCI bus master are that it includes a microprocessor which functions at some internal clock rate and that it may initiate and control operations on the PCI bus 12. One PCI bus slave circuit is a video output card which includes a frame buffer adapted to store video signals to be transferred to an output device such as a monitor for display.

Also connected to the PCI bus 12 is a PCI/secondary bus bridge circuit 17. The bridge circuit 17 performs the various functions necessary to transfer data between the PCI bus 12 and various component circuits joined to a secondary bus 18.

The secondary bus 18 may be an ISA bus or a EISA bus both of which transfer data at rates slower than does the bus 12. One specific PCI to EISA bus bridge circuit 17 is a part of a chip set manufactured by Intel Corporation and referred to as the 82374EB and 82375EB-EISA Bridge. Such a bridge circuit is described in detail in a publication by Intel Corporation entitled 82420/82430 *PCIset, ISA and EISA Bridges*. Such a bridge circuit 17 includes circuitry for providing the interfaces between the PCI bus 12 and the secondary bus 18 so that data may be transferred therebetween. The bridge circuit 17 is manufactured in one embodiment as a two chip integrated circuit set; a first one of these integrated circuits performs functions related to the PCI bus 12 and a second one of these integrated circuits performs functions related to the secondary (EISA) bus 18. The first integrated circuit provides circuitry which allows the bridge 17 to operate as an intercoupling bus master or a bus slave on the PCI bus 12. The second integrated circuit includes circuitry which allows the bridge 17 to perform bus master or bus slave functions on the secondary (EISA) bus 18. The bridge circuit 17 also includes within the two integrated circuit chips a first arbiter circuit 20 for controlling access to the PCI bus 12 and a second arbiter circuit 21 for controlling access to the secondary bus 18. In one embodiment, the circuitry of the EISA control portion of the bridge circuit 17 includes a DMA device connected as a bus master on the secondary bus 18 which is adapted to provide the advantages of the present invention. The ability of the bridge circuit 17 to act as a PCI bus master and a secondary bus slave allows a bus master circuit 19 positioned on the secondary bus 18 (for example, the DMA circuitry) to gain access to the PCI bus 12 and thence to the main memory. The PCI agents 16 may also gain access to component devices on the secondary bus in a similar manner.

Figure 2:
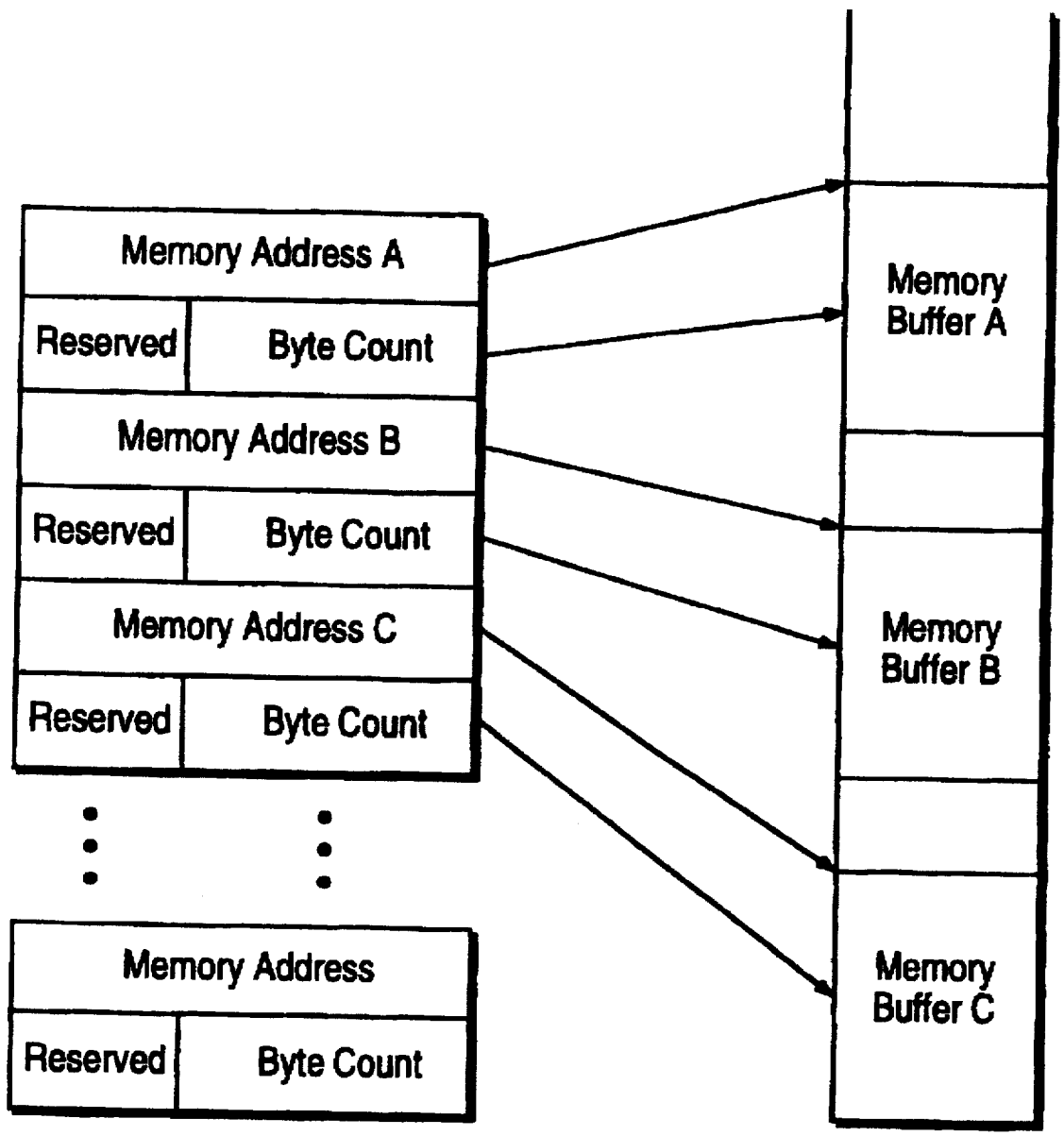
FIG. 2 is a diagram of a memory structure typically utilized in DMA operations.

The DMA circuitry utilized in the above-mentioned chip set is designed to function with various operating systems including Microsoft NT and Microsoft Windows 3.1 ("Windows") running with one of the versions of Microsoft DOS (e.g., MSDOS 6.0). When functioning with one of these operating systems, the prior art DMA operation to accomplish a data transfer between memory and an input/output device has started with the preparation of a list in memory of those scattered memory addresses which are to be accessed in the transfer of data with an input/output device. Each entry on this list includes a memory address of thirty-two bits, a byte count (which may include twenty-four bits) of the amount of data to be accessed, and a reserved byte, a total of eight bytes of data in one embodiment. The memory allocated to each of a number of individual entries is shown in FIG. 2. The Windows software includes a virtual DMA driver (a process which is run on the host processor for executing the DMA process using the DMA circuitry). The host processor runs the DMA virtual driver to prepare a list of entries which include the addresses from which (or to which) data stored in memory (or available at input/output) is to be transferred. When the list of entries has been prepared, the host processor initiates a DMA operation in which the DMA virtual driver first provides a read or a write command and the address of the first entry in the list to the DMA circuitry. This programs the DMA circuitry for operation by giving it the beginning address in memory at which the data is (or is to be) stored and the length of the first buffer. The read (or write) command indicates to the DMA circuitry that the data is to be read from (or written to) the addresses listed in the entries and written to (or read from) input/output. The DMA turns on and executes the transfer of data.

To accomplish this in a read operation from memory, for example, the DMA takes the original address in the entry, transfers the byte of data at that address, increments the address in an incrementer and decrements the byte count in a decrementer, then uses the incremented address to transfer the next byte of data at that address, increments the address and decrements the byte count, and continues this process until the byte count designating the amount of data stored beginning at the particular address indicates that the all of the bytes have been transferred. Since the address in memory is incremented as the DMA steps through the data from the beginning address, data in adjacent sequential byte addresses may be transferred in one operation.

When the DMA has completed the transfer of the first set of adjacent bytes, the DMA generates an interrupt to the host processor. The host processor receives the interrupt and retrieves the interrupt handler process for this interrupt. The interrupt handler process directs the host processor to refer the operation back to the virtual DMA driver process. The host processor then continues running the virtual DMA driver process which recognizes that the interrupt indicates that the data at the first address has been transferred and provides from the list of entries a second non-contiguous address and byte count to the DMA circuitry. The DMA circuitry takes this second address and handles the transfer of data in the same manner as has been explained above with respect to the first address. This process continues with the DMA interrupting the host processor after the DMA completes each set of transfers from sequential byte addresses which constitute a virtual buffer until the entire operation has been completed and all of the scattered data has been transferred to the desired input/output address at which the data is being gathered.

It will be recognized that the operation of the DMA under the prior art process just described is effective to gather information from scattered memory addresses in the computer system (or in a similar process, to write data from input/output devices to scattered addresses in memory) and to relieve the host processor of the necessity of accomplishing the individual transfers. However, the operation also requires that at each step of the operation, the host processor be interrupted in whatever it is doing in order to direct the DMA circuitry and process to its next operation. For this reason, such an operation is not what is generally referred to as a scatter/gather operation by a DMA. In fact, the process is so inefficient that the central processing unit typically does its own transfers of data to input/output rather than using the DMA process just described.

Figure 3:
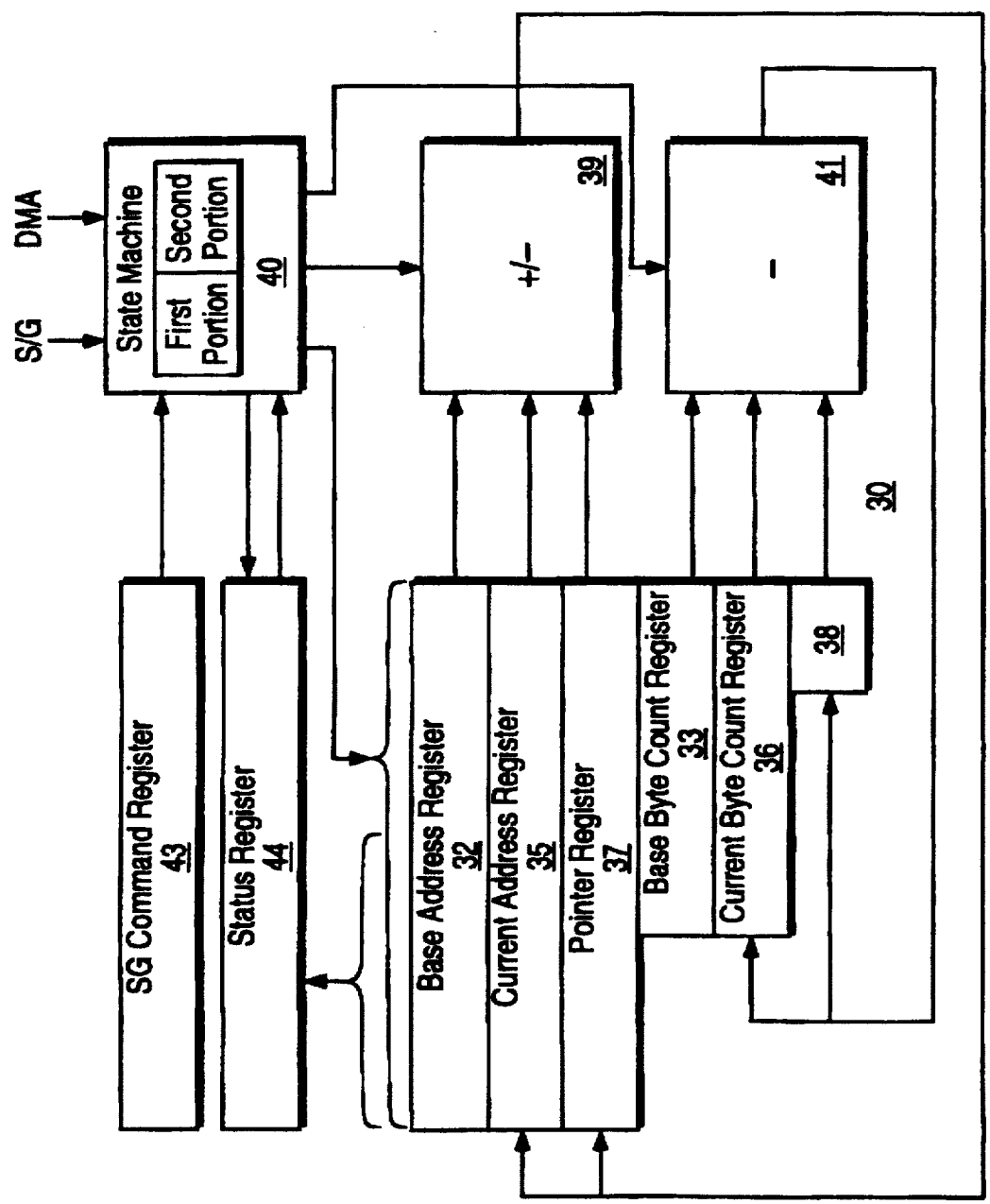
FIG. 3 is a block diagram illustrating a portion of a channel of a DMA constructed in accordance with the present invention.

FIG. 3 illustrates a DMA 30 constructed in accordance with the present invention. Each channel of the DMA 30 has a base address register 32 which is capable of storing a memory address and a base byte count register 33 for storing a byte count representing the number of bytes of data at an address which are to be transferred. In addition to these registers, a second current address register 35 which is capable of storing another memory address and a current byte count register 36 for storing a byte count of data at the current address are provided. The second set of registers is utilized to provide redundancy in order to increase the speed of operation.

The present invention adds to these registers 32, 33, 35, and 36, a first pointer register 37 for storing a pointer position indicating an address in memory and a second register 38 storing an initial value which may be decremented to provide a total count of eight. The three registers 32, 35, and 37 are arranged so that their contents may be selectively incremented by an incrementer/decrementer 39.

The three registers 33, 36, and 38 are arranged so that their contents may be selectively decremented by a decrementer 41. The DMA 30 also includes a state machine 40 which responds to control signals to provide the operations described hereinafter. A scatter/gather command register 43 is also provided for use in the operation. This register 43 includes various bits for controlling an operation. A status register 44 has a bit which indicates that a scatter/gather operation is active and two bits which individually indicate whether the base and current address registers are full or empty. The state machine 40 actually includes a master state machine portion known to those skilled in the art which controls the normal DMA transfer operations and a second state machine portion which is added to allow the scatter/gather operations to be implemented. The second portion of the state machine 40 reviews the states of the registers mentioned in carrying out its operations. Various other registers and circuit components which are not pertinent to the present invention are also included in the channels of the DMA circuitry; these components are controlled by the first state machine portion and function in the same manner in accomplishing a scatter/gather operation as in other DMA operations.

Figure 4:
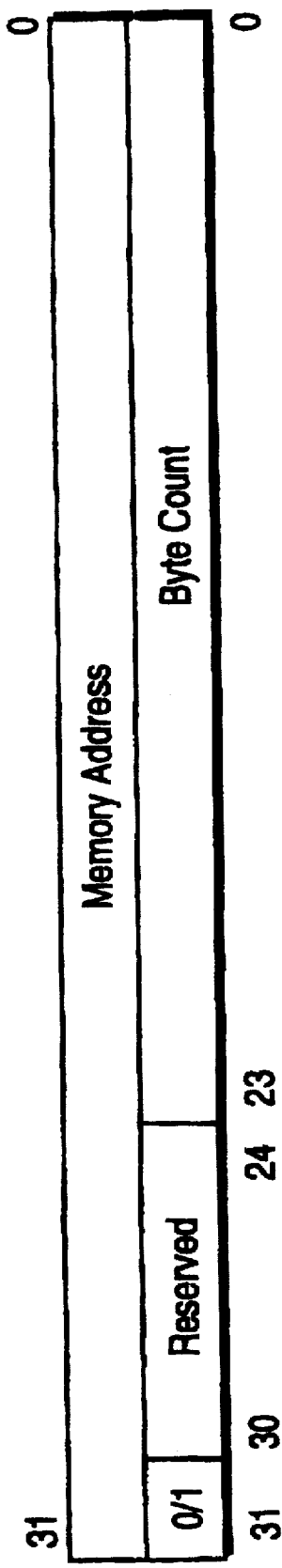
FIG. 4 is a diagram of a memory structure utilized in DMA operations in accordance with the present invention.
Figure 6:
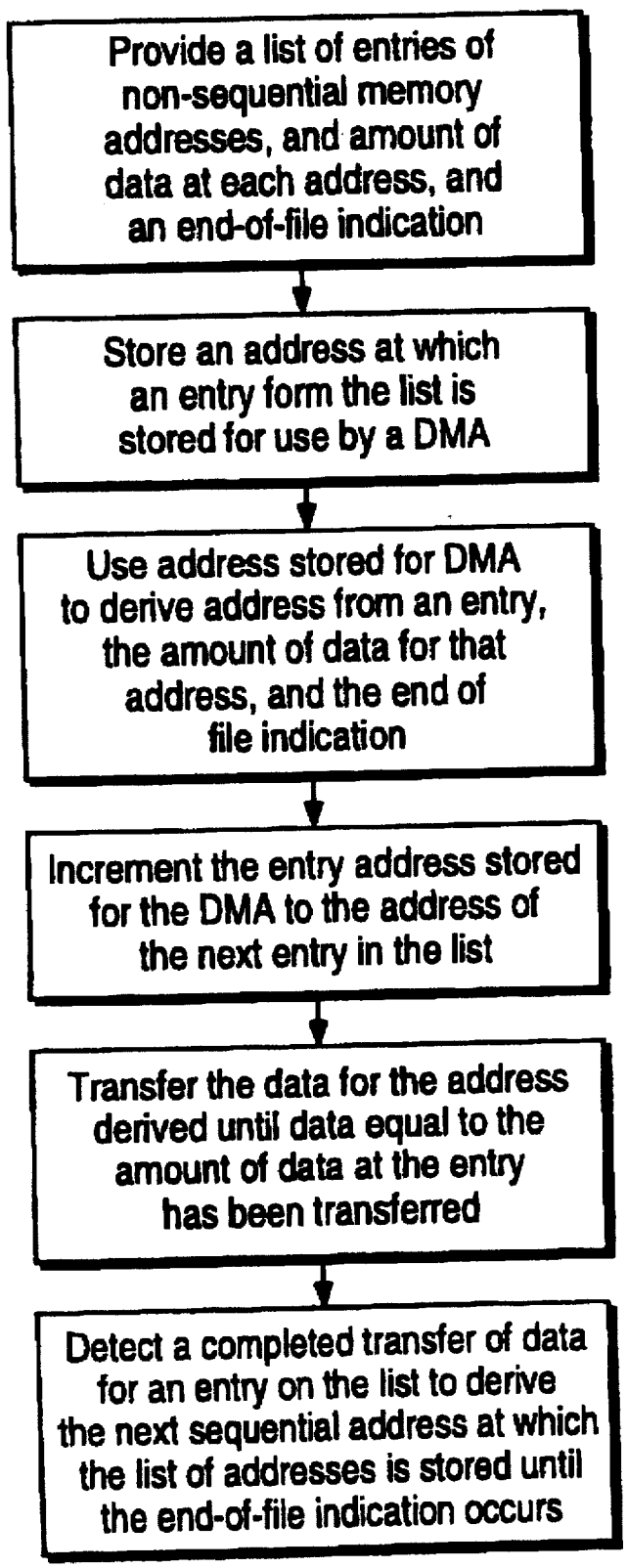
FIG. 6 is a flow chart illustrating a method of practicing the present invention.

The scatter/gather process of the present invention is illustrated in FIG. 6. In contrast to the prior art process of transferring scattered data described above, in the present invention, after the virtual DMA driver process compiles the list of entries with the addresses and byte counts of individual memory buffers from which the scattered data is to be gathered and places those addresses and the associated byte counts in a table of entries in memory, it transfers a pointer value indicating the address of the first entry of the list in the table to the DMA 30 and gives a command to the state machine 40 to start a scatter/gather operation from memory to an input/output device. The DMA 30 stores the pointer value in the pointer register 37. The second portion of the state machine 40 recognizes the presence of the pointer value, the fact that a scatter/gather operation has been initiated, and the absence of an address in the base register 32 as indicating that the pointer is to be used to retrieve an address and a byte count from a first entry in the list. This first operation is a standard DMA transfer by the master portion of the state machine using, however, the pointer value as the address of the first list entry rather than an address stored in either the base or the current address register. The second portion of the state machine causes the pointer address be used as in a standard DMA transfer operation to find the first entry in the list at which a transfer is to occur. This entry is accessed and the first address and byte count in the list of entries are transferred to the base address register 32 and the base byte count register 33. To accomplish this, the pointer value is interpreted by the DMA 30 as the address from which the entry data is to be transferred. Furthermore, in this operation, the second portion of the state machine 40 causes the master portion to consider the DMA 30 itself to be the input/output device for the transfer and to transfer the entry data beginning with the byte of data at the first pointer address to the base address register 32 of the DMA 30. The state machine 40 uses the value stored in the register 38 as the count to be decremented so that a total of eight bytes (the entire entry) will be transferred. At each count, the pointer value is incremented by the incrementer 39 and placed back in the pointer register 37. At each step, the value in the register 38 is decremented in the decrementer 41 and placed back in the register 38. During this transfer of the entry including the address and byte count to the DMA 30, the last bit of the last byte of the eight bytes at the first entry is reviewed by the second portion of the state machine 40 to determine if it is a one or a zero. In the list of entries according to the present invention, this bit is set to a zero if there is still data to be transferred residing at additional entries in the list. The bit is set to one for the last entry in the list from which data is to be transferred in the particular scatter/gather operation. FIG. 4 is a diagram of a memory structure for one entry utilized in DMA operations in accordance with the present invention and shows the position of the bit mentioned above in one embodiment. The entire set of data included in such a memory structure including the address, byte count, and the remaining eight bits are referred to as the entry.

When the first address and byte count included in the entry have been stored in the base address register 32 and the base byte count register 33, the data transfer from this first address is begun. This typically occurs in response to a request from the input/output controller. The data transfer is accomplished by the master portion of the state machine of the DMA 30 for the data at this first address and the number of sequential addresses indicated by the byte count. During this process, the address is incremented and the byte count for that address is decremented as the individual bytes are transferred to the appropriate address in memory until all bytes at that virtual buffer have been transferred.

The actual process by which this occurs is that the first address in the base register 32 at which data is to be accessed is used to access the first byte of data and transfer that data to (or from) the input/output position. Simultaneously, the master portion of the state machine 40 causes the first address to be incremented by the incrementer 39 and transferred to the current address register 35. The master portion of the state machine 40 also causes the number of bytes in the base byte count register 33 to be decremented by the decrementer 41 and returned to the current byte count register 36. Then, the byte at the first address is accessed and transferred. The second portion of the state machine 40 detects from the status register that the base address register 35 is empty and initiates an operation to fill the base address register with address and byte count data from the next entry in the list. This causes the DMA 30 to arbitrate for the PCI bus in order to access memory where the pointer (which has been incremented by eight address bytes) is used to find the next entry in the list in memory. The DMA 30 moves the eight bytes at that entry to the DMA 30 and places the address and the byte count from the entry in the base address register 32 and the base byte count register 33. The pointer address is again incremented by the incrementer 39 and returned to the pointer register 37 as it is used during each of these steps.

By providing a new base address and byte count in the registers 32 and 33 from the next entry in the list for the next address which is to be accessed in the scatter/gather operation, the operation may continue without any significant latency when the count of bytes for data still to be transferred from the current address has gone to zero. A count in the current byte count register 36 signifying no bytes remain indicates to the second portion of the state machine 40 that the DMA 30 is ready to transfer data from (or to) the address in the next entry on the scatter/gather list. The second portion of the state machine 40 causes the master portion of the state machine 40 to use the address in the base address register 32 and begin another DMA transfer operation. The address in the base address register 32 is incremented and again placed in the current address register 35 while the byte count in the base byte count register 33 is decremented and again placed in the current byte count register 36. Again, the second portion of the state machine 40 detects that the base address register 32 is empty and initiates an operation to fill the base address register 32. The DMA uses the pointer value in the register 37 which has been incremented by eight address bytes from its initial value to find the next address and byte count from the next entry of the list, move the eight bytes at that pointer address to the DMA, and store the address and byte count in the base register 32 and the base byte count register 33.

At each step of the operation as the data at the entry is transferred to the DMA, the condition of the bit in the last bit position of the eighth byte of the entry is sensed in the manner explained above. So long as this bit is a zero, the transfer of the address from the base address register 32 to the current address register 35 causes the base address register 32 to be refilled with a next address from the transfer addresses in the list of entries in memory and the pointer to be incremented so that the scatter/gather operation will continue. When, however, this bit is a one, the second portion of the state machine 40 detects that this transfer marks the end of the scatter/gather operation. The DMA waits for the byte counts for the addresses in the current and base address registers to indicate that no bytes remain to be transferred, and then signals the host processor that the scatter/gather operation is complete.

In this manner, a scatter/gather operation is provided for the personal computers which utilize the Intel processors and which include a DMA controller constructed in accordance with the present invention.

Figure 5:
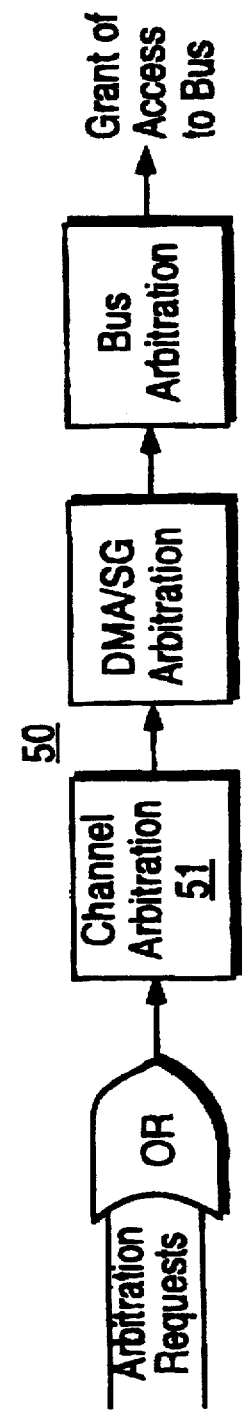
FIG. 5 is a block diagram illustrating another portion of circuitry utilized in carrying out the invention.

In order to assist the other circuitry of the DMA 30 which has been described, arbitration circuitry illustrated in FIG. 5 is utilized. The arbitration circuitry includes a first circuit 50 for performing an OR logical function. This circuit 50 receives an arbitration request from a process which wishes to accomplish either a DMA transfer or a scatter/gather operation. Any such request is transferred to channel arbitration circuit 51 where a DMA channel is ultimately granted for servicing the request. The result of the granting of the request is to transfer a signal to a DMA/scatter-gather arbitration circuit which selects any scatter/gather operation as having higher priority than a standard DMA transfer whenever an address has been loaded to the base address register or the current address register and value in the byte count has not expired. The result of this arbitration initiates a bus request signal which in turn initiates arbitration for access to one of the connected buses.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer system comprising:
    a central processing unit;
    main memory;
    a bus for transferring data and addresses; and
    a direct memory access (DMA) circuit for accessing scattered blocks of data without CPU interrupts, the DMA circuit comprising:
        a first register for storing an address for data,
        a second register for storing a count of data at the address in the first register,
        a circuit for incrementing the address in the first register and decrementing the count in the second register until all data in a DMA transfer step has been transferred, a pointer register for holding an address of an entry in an entry list, each entry therein including:
   an address value,
   a byte count value according to which a DMA transfer step is to be performed, and
   a last entry bit indicating whether the entry is last in the entry list, and
a state machine for controlling operations of the DMA circuit including:
   a first portion for transferring data from one address to another, and
   a second portion for transferring an entry at the address held in the pointer register to the DMA circuit and an address in the entry to the first register and for sensing the last entry bit, the second portion functioning in response to:
      an indication that the DMA transfer step has been initiated, and
      the last entry bit.

2. The computer system as claimed in claim 1 in which the DMA circuit further comprises:
   value holding circuitry for holding a value equal to the total available bytes in an entry at an address held in said pointer register,
   transferring circuitry controlled by the second portion of the state machine to transfer an entry at an address held in the pointer register to the first register; and
   count circuitry for counting the number of bytes to be transferred.

3. The computer system as claimed in claim 1 in which the DMA circuit further comprises an additional register for storing a new address from an entry being transferred to the first register until all data at sequential addresses beginning at an old address in the first register has been transferred.

4. A computer system as claimed in claim 1 further comprising an arbitration circuit for accessing the bus.

5. A direct memory access circuit (DMA) circuit comprising:
   a first register for storing an address for data,
   a second register for storing a count of data at the address in the first register,
   a circuit for incrementing the address in the first register and decrementing the count in the second register until all data in a DMA transfer step has been transferred,
   a pointer register for holding an address of an entry in an entry list, each entry therein including:
      an address value,
      a byte count value according to which a DMA transfer step is to be performed, and
      a last entry bit indicating whether the entry is last in the entry list, and
   a state machine for controlling operations of the DMA circuit including:
      a first portion for transferring data from one address to another, and
      a second portion for transferring an entry at the address held in the pointer register to the DMA circuit and an address in the entry to the first register and for sensing the last entry bit, the second portion functioning in response to:
         an indication that the DMA transfer step has been initiated, and
         the last entry bit.

6. The direct memory access (DMA) circuit as claimed in claim 5 further comprising:
   value holding circuitry for holding a value equal to the, total available bytes in an entry at an address held in the pointer register,
   first circuitry controlled by the second portion of the state machine to transfer an entry at an address held in the pointer register to the first register; and
   second circuitry for counting the number of bytes to be transferred.

7. A direct memory access (DMA) circuit as claimed in claim 5 further comprising an additional register for storing a new address being transferred to the first register until all data at sequential addresses beginning at an old address in the first register has been transferred.

8. An computer system comprising: a central processing unit; main memory; a bus for transferring data and addresses coupled to the central processing unit and the main memory; and a direct memory access (DMA) coupled to the bus, the DMA circuit comprising:
   first means for storing a starting address in memory for a list of entries, each entry including addresses and counts of the amount of data included at each address, each entry further including a designation bit, setting of the bit indicating an entry is a last entry in the list;
   second means for storing an address for data to be transferred by the direct memory access circuit;
   third means for retrieving a subsequent entry from said list including means to transfer the address to the second means;
   fourth means responsive to any address in the memory for a list of entries for transferring an entry from said list to the second means for storing an address;
   fifth means responsive to an address in the second means for sequentially transferring data beginning at the address in the second means, the fifth means also for incrementing an address in the second means and transferring data until the count of the amount of data is exhausted;
   sixth means for sensing that data at an address on the list of entries has yet to be transferred; and
   seventh means for incrementing the address held by the first means and for causing the third means to respond, while said fifth means is active, to the address in the first means and transfer the subsequent entry from the list of entries to the second means so long as entries at addresses on the list of entries have yet to be transferred and said fifth means has completed transfer of all data.

9. The computer system as claimed in claim 8 in which the fourth means is responsive to any address in the first means for storing an address and for transferring an address from an entry in the list in memory of entries to the second means for storing an address compromises a first portion of a state machine.

10. The computer system as claimed in claim 8 in which the sixth means for sensing that data at addresses on the list of entries has yet to be transferred includes means for detecting a bit stored in the entries in the list, and
   the seventh means for incrementing the address held by the first means comprises a second portion of a state machine for responding to the condition of the bit stored in the entries in the list.

11. An direct memory access (DMA) circuit for use in a computer system comprising:
   first means for storing a starting address in memory for a list of entries, each entry including addresses and counts of the amount of data included at each address, each entry further including a designation bit, setting of the bit indicating an entry is a last entry in the list;
   second means for storing an address for data to be transferred by the direct memory access circuit;

third means for retrieving a subsequent entry from said list including means to transfer the address to the second means;

fourth means responsive to any address in the memory for a list of entries for transferring an entry from said list to the second means;

fifth means responsive to an address in the second means for sequentially transferring data beginning at the address in the second means, includes means for incrementing an address in the second means and transferring data until the count of the amount of data is exhausted;

sixth means for sensing that data at an address on the list of entries has yet to be transferred; and seventh means for incrementing the address held by the first means and for causing the third means to respond, while said fifth means is active, to the address in the first means and transfer the subsequent entry from the list of entries to the second means, so long as entries at addresses on the list of entries have yet to be transferred and said fifth means has completed transfer of all data.

12. The direct memory access (DMA) circuit as claimed in claim 11 in which the fourth means is responsive to any address in the first means for storing a beginning address and for transferring an address from the list of entries to the second means for storing an address compromises a first portion of a state machine.

13. A direct memory access (DMA) circuit as claimed in claim 11 in which the sixth means for sensing that data at addresses on the list has yet to be transferred includes means for detecting a bit stored in each entry in the list, and the seventh means for incrementing the address held by the first means comprises a second portion of a state machine for responding to the condition of the bit stored in each entry in the list.

14. A method for performing a direct memory access (DMA) operation, comprising:

a) loading a pointer register with an indication of the address within a memory of a first DMA entry;

b) retrieving from the first DMA entry a first address indication and a first byte count indication;

c) advancing the contents of the pointer register to indicate the address of a subsequent DMA entry;

d) transferring data, in a first DMA transfer step, according to the first address indication and the first byte count indication;

e) retrieving from the subsequent DMA entry, a subsequent address indication, a subsequent byte count indication and a last-entry bit, the retrieving occurring after initiating the current DMA transfer step and prior to completing it;

f) transferring data, in a subsequent DMA transfer step, according to the subsequent address indication and the subsequent byte count indication; and g) when the last-entry bit is false, advancing the contents of the pointer register to indicate the location of another subsequent DMA entry and repeating the steps (e) through (g).

15. The method of claim 14 further comprising:

h) placing, under the control of a host processor, the first and the subsequent DMA entries in the memory;

wherein each subsequent DMA transfer step follows the preceding DMA transfer step without intervention from the host processor.

16. The method of claim 14 wherein the first and the second DMA transfer steps occur under the control of a current address register and a current byte count register, the current address and the current byte count registers being initialized for the first DMA transfer step based on, respectively, the first address and the first byte count indications, and the current address and the current byte count registers being initialized for the second DMA transfer step based on, respectively, the second address and the second byte count indications.

17. A direct memory access (DMA) controller system, comprising:

a) a pointer register configured to contain an indication of the address within a memory of a current one of a plurality of DMA entries, each DMA entry including an address indication, a byte count indication and a last-entry bit;

b) a base address register configured to retrieve from the memory the address indication from the current DMA entry;

c) a base byte count register configured to retrieve from the memory the byte count indication from the current DMA entry; and d) means for transferring data, in a DMA transfer step, based on the address indication in the base address count register and the byte count indication in the base byte count register;

when the last-entry bit of the previous DMA entry is false, said base address register and said base byte count register being configured to retrieve another address indication and another byte count indication after the DMA transfer means initiates the current DMA transfer step and prior to completing the same.

18. The DMA controller system of claim 17 further comprising:

e) a host processor, under the control of which the plurality of DMA entries are placed in the memory, and whose intervention is not needed upon completion of any DMA transfer step other than the last DMA transfer step.

19. The DMA controller system of claim 17 further comprising:

e) a current address register that is initialized for the first DMA transfer step based on the first address indication, and that is initialized for each subsequent DMA transfer step based on the subsequent address indication; and f) a current byte count register that is initialized for the first DMA transfer step based the first byte count indication, and that is initialized for each second DMA transfer step based the subsequent byte count indication;

wherein each DMA transfer step occurs under the control of the current address and the current byte count registers.

* * * * *